US009677958B2

(12) United States Patent
Rolf

(10) Patent No.: US 9,677,958 B2
(45) Date of Patent: Jun. 13, 2017

(54) PRELOAD DEVICE OF A FORCE MEASUREMENT DEVICE

(71) Applicant: KISTLER HOLDING AG, Winterthur (CH)

(72) Inventor: Thiel Rolf, Baenk (CH)

(73) Assignee: KISTLER HOLDING AG, Winterthur (CH)

( * ) Notice: Subject to any disclaimer, the term of this patent is extended or adjusted under 35 U.S.C. 154(b) by 0 days.

(21) Appl. No.: 15/127,125

(22) PCT Filed: Apr. 1, 2015

(86) PCT No.: PCT/CH2015/000051
§ 371 (c)(1),
(2) Date: Sep. 19, 2016

(87) PCT Pub. No.: WO2015/149190
PCT Pub. Date: Oct. 8, 2015

(65) Prior Publication Data
US 2017/0122823 A1 May 4, 2017

(30) Foreign Application Priority Data
Apr. 2, 2014 (CH) .................................. 506/14

(51) Int. Cl.
G01N 3/08 (2006.01)
G01L 5/00 (2006.01)
G01L 1/16 (2006.01)

(52) U.S. Cl.
CPC .............. G01L 5/0028 (2013.01); G01L 1/16 (2013.01); G01L 5/0004 (2013.01)

(58) Field of Classification Search
CPC ....... G01L 5/0028; G01L 1/16; G01L 5/0004; G01N 3/08
(Continued)

(56) References Cited

U.S. PATENT DOCUMENTS 3,577,112 A   5/1971  Bowen et al.
4,088,015 A * 5/1978  Wolfer .................. G01L 1/16
                                                  73/862.381

(Continued)

FOREIGN PATENT DOCUMENTS

DE           102 42 250 A1    3/2004
DE      10 2006 017 174 A1   10/2007
(Continued)

OTHER PUBLICATIONS

International Search Report, issued Jun. 18, 2015.

Primary Examiner — Lisa Caputo
Assistant Examiner — Octavia Hollington
(74) Attorney, Agent, or Firm — Dority & Manning, P.A.

(57) ABSTRACT

A preload device has a receiving pocket for receiving a force sensor. A tool engagement section is spaced apart from the receiving pocket in the direction of the longitudinal axis. At least one elastically flexible section is non-detachably arranged between the receiving pocket and at least one of at least two force introduction plates. Elastic bending of the at least one elastically flexible section through the application of forces to at least one of the force introduction plates and to the tool engagement section effects a reduction in the height of a relaxed state of the preload device to facilitate insertion of the preload device in a recess in a machine part or between multiple machine parts or in a drum.

15 Claims, 4 Drawing Sheets

(58) Field of Classification Search
USPC .......................................................... 73/818
See application file for complete search history.

(56) References Cited

U.S. PATENT DOCUMENTS

| | | | | |
|---|---|---|---|---|
| 4,793,193 | A * | 12/1988 | Borgudd | B60D 1/06 |
| | | | | 338/99 |
| 5,824,917 | A | 10/1998 | Kluft | |
| 6,327,913 | B1 | 12/2001 | Lustenberger et al. | |
| 7,240,711 | B2 * | 7/2007 | Chan | H01L 21/67092 |
| | | | | 156/351 |
| 7,500,398 | B2 | 3/2009 | Tschanz | |
| 8,726,740 | B1 * | 5/2014 | Mekid | B23Q 17/0966 |
| | | | | 73/862.041 |
| 9,304,032 | B2 * | 4/2016 | Cornu | G01G 3/13 |
| 9,347,816 | B2 * | 5/2016 | Cornu | G01G 3/13 |
| 2006/0266561 | A1 | 11/2006 | Dellac et al. | |
| 2008/0166200 | A1 * | 7/2008 | Hippensteele | F16B 31/02 |
| | | | | 411/14.5 |
| 2013/0114994 | A1 * | 5/2013 | Grip | B64C 1/26 |
| | | | | 403/41 |

FOREIGN PATENT DOCUMENTS

| | | |
|---|---|---|
| EP | 0 719 405 | 3/1995 |
| EP | 1 726 935 A1 | 11/2006 |
| WO | WO 00/03218 | 1/2000 |
| WO | WO 2004/065924 A1 | 8/2004 |

* cited by examiner

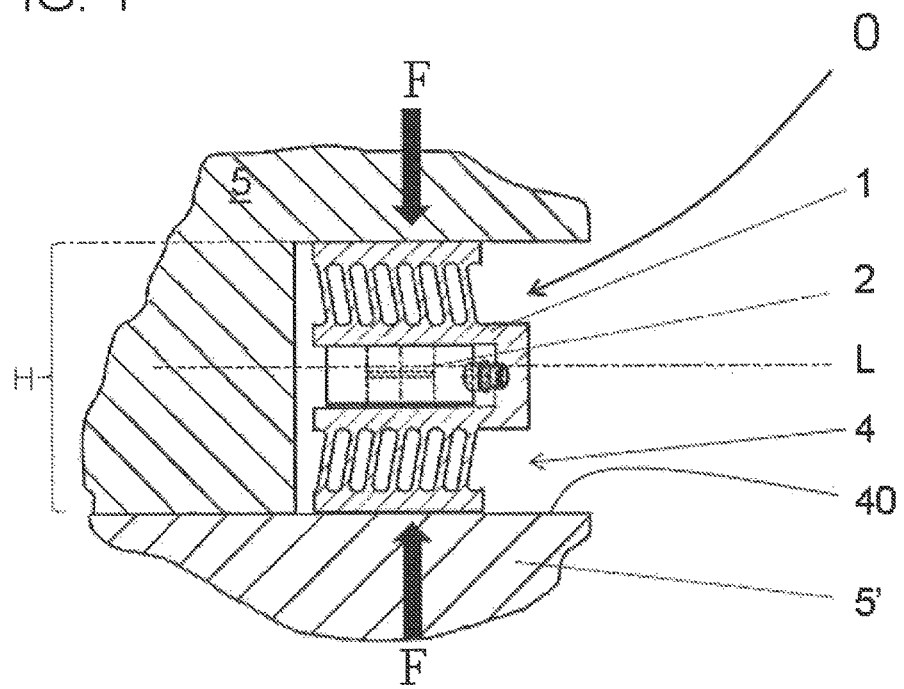
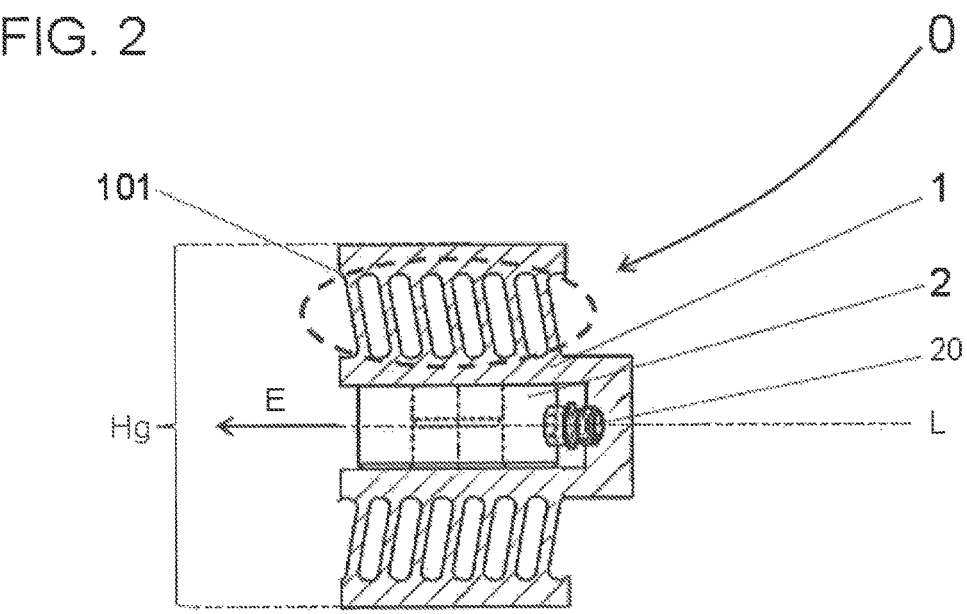

PRELOAD DEVICE OF A FORCE MEASUREMENT DEVICE

CROSS-REFERENCE TO RELATED APPLICATIONS

This application claims priority to International Application Serial No. PCT/CH2015/000051, filed Apr. 1, 2015, which claims priority to Swiss Application No. 506/14, filed Apr. 2, 2014. International Application Serial No. PCT/CH2015/000051 is hereby incorporated herein in its entirety for all purposes by this reference.

FIELD OF THE INVENTION

The invention pertains to a preload device with a receiving pocket for receiving a force sensor, wherein said preload device comprises at least two force introduction plates, which are arranged opposite of one another in a direction extending perpendicular to the longitudinal axis and have force introduction surfaces that point away from one another, to a force-measuring device, as well as to a method for mounting a force-measuring device in a recess in one or between multiple machine parts or in a roller.

BACKGROUND

Force-measuring devices comprising a preload device for mounting a force sensor have been known for quite some time and in different variations. Force-measuring devices of this type can measure applied dynamic and quasi-static forces in at least one direction in space. The force sensors used preferably consists of piezoelectric force sensors, usually so-called piezoelectric measuring washers. Known force measuring devices are used in various applications for measuring different forces, for example in process monitoring.

U.S. Pat. No. 5,824,917, which is hereby incorporated herein by this reference for all purposes, discloses a force-measuring device with a multipart preload device for a force sensor in the form of a double-wedge force-measuring device. This device is suitable for measuring forces between machine parts extending parallel to one another, preferably in accordance with the force bypass principle. The orthogonal distance between the parallel contact surfaces is variable. Two wedges, which can be displaced relative to one another, are connected to one another by means of an adjusting device. The wedges and the force sensor are separably mounted in a pocket-shaped recess between the machine parts, wherein the force sensor and the wedges form a structural unit and the force sensor is integrated into the first wedge. A first measuring surface of the force sensor protrudes from the first wedge and forms first contact surfaces. The force sensor is supported in the first wedge with the second measuring surface. This multipart design should have a small structural height and therefore be easy to install.

The preload device known from U.S. Pat. No. 7,500,398, which is hereby incorporated herein by this reference for all purposes, which forms a force-measuring device together with a force sensor, can be inserted into recesses with parallel walls, as well as into cylindrically symmetrical recesses, and fixed therein under preload such that a more flexible force measurement can be achieved. For example, forces acting upon a roller can thereby be measured by arranging the preload device with the force sensor functionally connected thereto in a cylindrical bore in the roller. The preload device has a multipart design and features a bolt and a pedestal with at least one wedge surface. At least one clamping element is movably arranged on the wedge surface and drawn against a retaining plate by means of a tensioning screw. In a special embodiment, spring elements are used for ensuring that a counterpressure is exerted upon the clamping element by the retaining plate. The force sensor with this compactly designed preload device is separably mounted in a recess under preload by simply tightening the tensioning screw with a suitable tool, wherein the height of the preload device in a preloading direction can be adapted to the size of the recess by tightening the tensioning screw accordingly. Force introduction surfaces of the preload device adapt themselves to the walls of the respective recess such that forces are transmitted to the preload device and to the force sensor. The preload device can be mounted and removed by being accessed from a direction extending transverse to the preloading direction only such that a preload device of this type can be arranged and used in a cylindrical bore in a roller.

The respective preload devices and force-measuring devices comprising a preload device with installed force sensor, which are known from the prior art, have a multipart design and need to be elaborately mounted between the walls of differently shaped recesses under preload by means of a screw-driving tool. The preloaded state of the preload device is achieved by screwing together a wedge-like construction and thereby adjusting the height of the preload device. During this height adjustment, a tensioning screw is tightened until surfaces of the preload device sufficiently press against the recess walls and the force sensor is thereby clamped in position under sufficient preload. In known preload devices, the force sensor is clamped in position asymmetrically, for example, by means of the preload device on one side and by means of a bolt relative to the recess wall on the opposite side. Frictional forces act upon the force sensor during the respective displacement or adjustment of the wedges by means of the tensioning screw.

BRIEF SUMMARY OF THE INVENTION

The invention aims to develop a preload device, which can be positioned and separably mounted in differently shaped recesses in a flexible and simplified fashion. Interfering frictional forces acting upon the force sensor should be prevented during the insertion of the preload device. The recess may be respectively located between machine parts or in a cylindrical bore in a machine part. The invention is based on the objective of realizing a preload device, which can be mounted in the recess without a screw-driving tool and without screwing.

This objective is attained with the design of the preload device, in which at least one elastically flexible section is provided. In this way, the preload device can during its insertion be transferred into an elastically compressed insertion state with minimized device height and therefore inserted between the recess walls in a frictionless fashion. Once the desired end position is reached, the preload device can be transferred into an elastically tensioned installation state such that the preload device and the force sensor fixed therein are held in a measuring position in the recess under preload. The force sensor is not subjected to any frictional forces during the insertion of the preload device in an elastically compressed insertion state.

In contrast to the prior art, it is no longer required to displace rigid clamping elements, for example wedges, such that disruptive jamming thereof is avoided.

BRIEF DESCRIPTION OF THE DRAWINGS

The invention is described in greater detail below with reference to the drawings.

FIG. 1 shows a sectional view of a force-measuring device comprising a force sensor that is separably fixed in a preload device, wherein the force-measuring device is clamped in a recess between two machine parts in an elastically tensioned installation state.

FIG. 2 shows a longitudinal section through a force-measuring device in a relaxed basic state prior to its insertion into a recess.

DESCRIPTION OF EXEMPLARY EMBODIMENTS OF THE INVENTION

Figure 3:
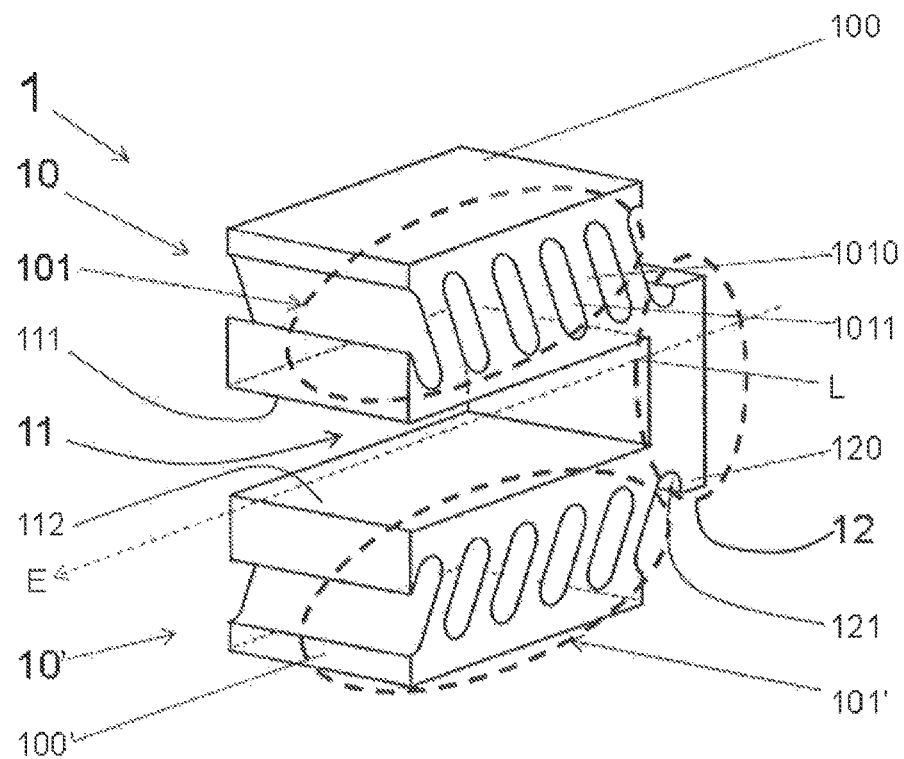
FIG. 3 shows a perspective view of only the preload device in a relaxed basic state.

FIG. 1 shows a force-measuring device 0 that comprises a preload device 1 and a force sensor 2. The preload device 1 has a one-piece design in this case and is inserted, as well as separably clamped, in a recess 4 between two machine parts 5, 5'. The recess 4 is formed by plane, smooth recess walls 40, wherein the distance in the force application direction, which is characterized by the forces F acting perpendicular to the longitudinal direction L, corresponds to the height H of the preload device 1 in an elastically tensioned installation state. The preload of the preload device 1 is a consequence of its construction because the preload device 1 is elastically flexible in a defined section and therefore can be inserted into the recess 4 and clamped against the recess walls 40 therein. The forces F acting upon the machine parts 5, 5' transverse to the longitudinal axis L and therefore in a clamping direction can be measured by means of the clamped-in force sensor 2.

As an example shown in FIG. 2, the force sensor 2 used in this case consists of a piezoelectric measuring washer 2 with a multipart housing, on which a connecting device 20 is fixed or integrally formed. The housing is typically made of steel and features a cover and a bottom. In this case, two piezoelectric bodies of annular design are stacked on top of one another in the housing. An electrode is located between the piezoelectric bodies that are respectively realized in the form of rings. Connecting cables in the form of highly insulated low-capacity coaxial cables are used for the external wiring of the piezoelectric measuring washer 2 to not-shown measuring electronics. These also not-shown connecting cables only generate minimal frictional electricity during their minimal motion. Such connecting cables for industrial use are commercially available and can be easily connected to the connecting device 20 of the piezoelectric measuring washer 2 in order to tap charge signals of the piezoelectric bodies. In order to enable the piezoelectric measuring washer 2 to measure forces, the components have to be arranged in the housing such that they press against one another in the clamping direction and immovably welded into the housing in this state.

In a relaxed basic state illustrated in FIG. 2, the force-measuring device 0 and the preload device 1 respectively considered together has a height Hg in the clamping direction. The preload device 1 can be inserted into a recess 4 (FIG. 1) in an inserting direction E extending transverse to the clamping direction. At least one elastically flexible section 101 is provided on the preload device 1 in order to insert the preload device 1 into a recess 4, wherein this elastically flexible section 101 allows a partial elastic deflection of the preload device 1 in the clamping direction. The elastically flexible section 101 extends parallel to the longitudinal axis L whereas a height variation in the clamping direction and therefore perpendicular to the longitudinal axis L takes place during an elastic deflection.

A concrete embodiment of a preload device 1 is illustrated in FIG. 3 and has a fork-shaped design, wherein two arms 10, 10' are arranged such that they protrude away from a tool engagement section 12 in the direction of the longitudinal axis L. A receiving pocket 11, in which the force sensor 2 is positioned and separably fixed, is arranged between the arms 10, 10'. The receiving pocket 11 has a first wall 111 and a second wall 112, between which the force sensor 2 can be clamped. The receiving pocket 11 is shaped in such a way that the walls 111, 112 can uniformly transmit forces to the force sensor 2, which is clamped between these walls and therefore fixed without play. Since the two arms 10, 10' can be elastically deflected relative to one another in the clamping direction, the force sensor 2 can be clamped in the receiving pocket 11 such that the force sensor 2 is at least partially enclosed by the plane walls 111, 112.

The tool engagement section 12 features a tension/pressure plate 120 that can be functionally connected to a not-shown tool. The connection between the tool engagement section 12 and the tool can be promoted by means of an integrally formed undercut 121.

The arms 10, 10' respectively comprise a force introduction plate 100, 100' that features plane force introduction surfaces in this case. The elastically flexible sections 101, 101' are respectively located adjacent to the force introduction plates 100, 100' and extend from the respective force introduction plate 100, 100' in the direction of the receiving pocket 11. The at least one elastically flexible section 101 is fixed between the receiving pocket 11 and at least one of the force introduction plates 100 inseparably in a direction extending perpendicular to the longitudinal axis L.

In the preferred embodiment shown, the elastically flexible sections 101, 101' are respectively formed by a plurality of lamellae 1010 that are spaced apart from one another by oblong holes 1011 extending through the elastically flexible section 101, 101'.

Figure 4:
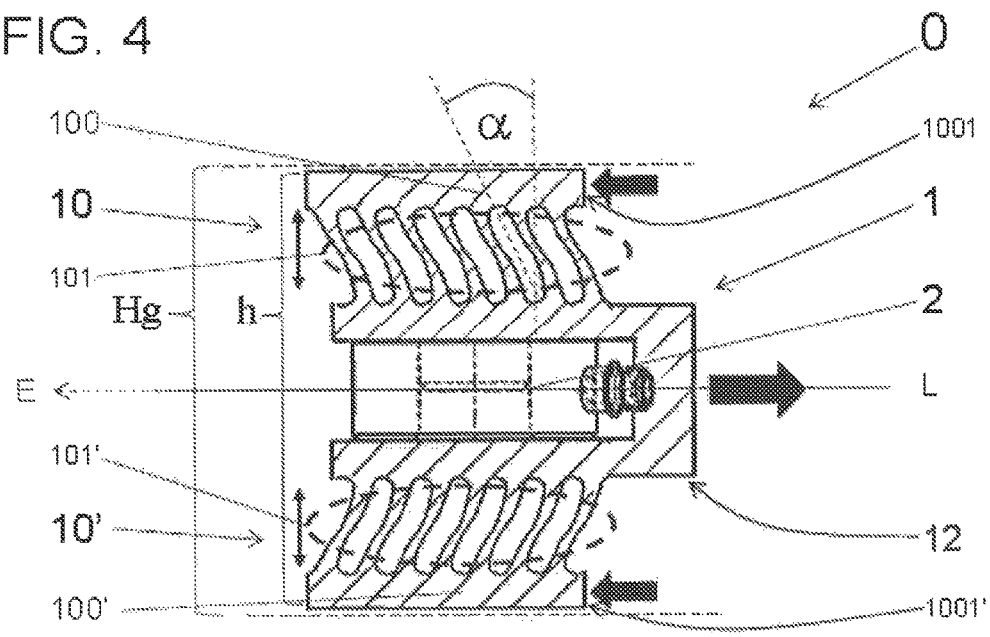
FIG. 4 shows a sectional view of a force-measuring device, in which the preload device is illustrated in an elastically compressed insertion state.

FIG. 4 shows a force-measuring device 0 in an elastically compressed insertion state, wherein the tool is not illustrated for the sake of simplicity. Oppositely directed forces indicated schematically with double-headed arrows respectively act upon the preload device 1, specifically upon edge sections 1001, 1001' of both force introduction plates 100, 100' and upon the tool engagement section 12. These forces are exerted by a user, wherein a tool is preferably used for this purpose. The forces act upon the edge sections 1001, 1001' in the inserting direction E whereas the forces act upon the tool engagement section 12 opposite to the inserting direction E. When the described forces are exerted, the elastically flexible sections 101, 101' are elastically deflected in such a way that the distance between the respective force introduction plate 100, 100' and the receiving pocket 11 is reduced. In this way, the structural height of the preload device 1 is reduced from the height Hg in the relaxed basic state to a height h in the insertion state, wherein h is correspondingly smaller than Hg. Such an elastically deformed preload device 1 can be inserted into a recess 4 with a height that lies between Hg and h.

Since the elastic deformation of the arms 10, 10' has no effect on the walls 111, 112 of the receiving pocket 11, no interfering forces act upon the clamped-in force sensor 2 during the insertion of the preload device 1. Once the preload device 1 is located in the desired measuring position in the recess 4, the forces exerted upon the arms 10, 10' and the tool engagement section 12 are reduced to zero.

The elastically flexible section 101 shown in FIGS. 3 and 4 for example features a plurality of lamellae 1010 that are elastically flexible within defined limits and aligned at an angle α (FIG. 4) relative to the clamping direction. The clamping direction is aligned perpendicular to the longitudinal axis L of the preload device 1. Accordingly, the oblong holes 1011 between the lamellae 1010 are also arranged angularly. This angle α preferably is chosen such that it deviates from the clamping direction by 10° or less. If a force is exerted upon the force introduction plate 100 in the elastically compressed insertion state, all lamellae 1010 are elastically deflected about uniformly, wherein a height difference results between the different states of the preload device 1.

After the forces have ceased, the elastically flexible sections 101, 101' attempt to return to their original shape, wherein the distances of the force introduction plates 100, 100' from the receiving pocket 11 are due to resilience increased until the force introduction surfaces of the force introduction plates 100, 100' contact the recess walls 40. According to FIG. 1, the structural height of the preload device 1 changes from h (FIG. 4) to the height H of the recess 4 during this process. Accordingly, the preload device 1 and the force-measuring device 0 respectively are separably mounted in the recess 4 under preload in a form-fitting fashion due to the resilience of the elastically flexible sections 101, 101'.

After the force-measuring device 0 has been positioned in a recess 4 and mounted in a measuring position under preload, optional securing means 3 may be used for preventing the force-measuring device 0 from shifting in the recess 4 and for ensuring a constant preload.

Figure 5A:
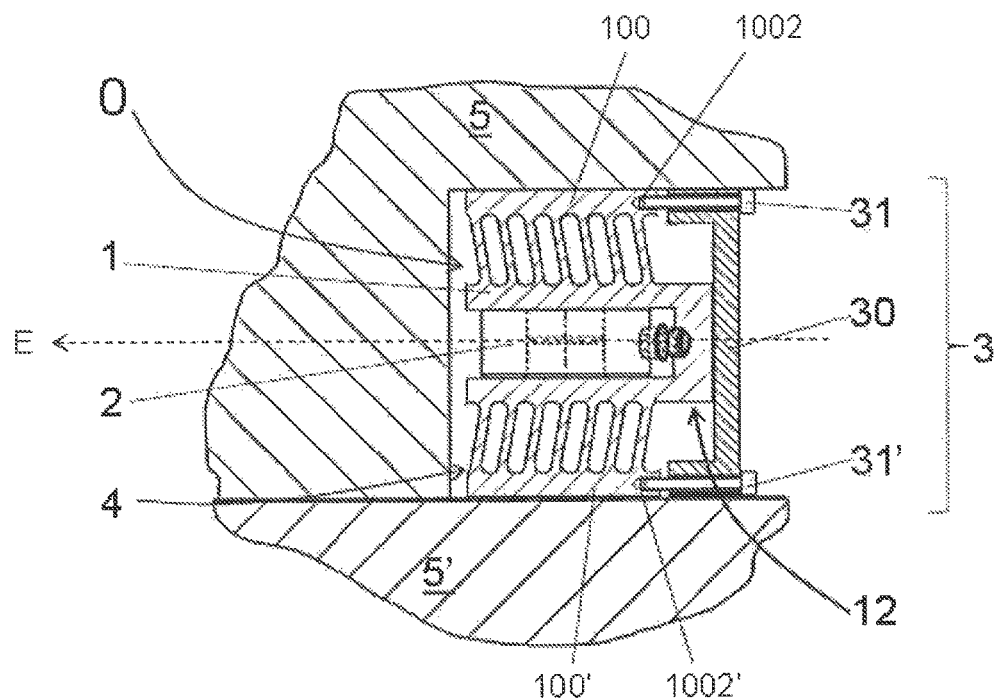
FIGS. 5a and 5b respectively show sectional views of a force-measuring device, in which the preload device is respectively held in the elastically tensioned installation state by means of additional securing means.

According to the example illustrated in FIG. 5a, the securing means 3 may comprise a beam that can be placed on the preload device 1 such that it acts upon the tool engagement section 12 in the inserting direction E. Screws 31, 31' are provided for mounting the beam 30 on the preload device 1, wherein said screws penetrate the beam 30 in the edge region and are separably fixed in threaded bores 1002 in the force introduction plates 100, 100'. Tightening of the screws 31, 31' makes it possible to increase the preload of the preload device 1 due to the respective deflection or resilience of the lamellae 1010 of the elastically flexible sections 101, 101', wherein the rigidity of the preload device 1 can be respectively increased in the force application direction F or clamping direction.

Figure 5B:
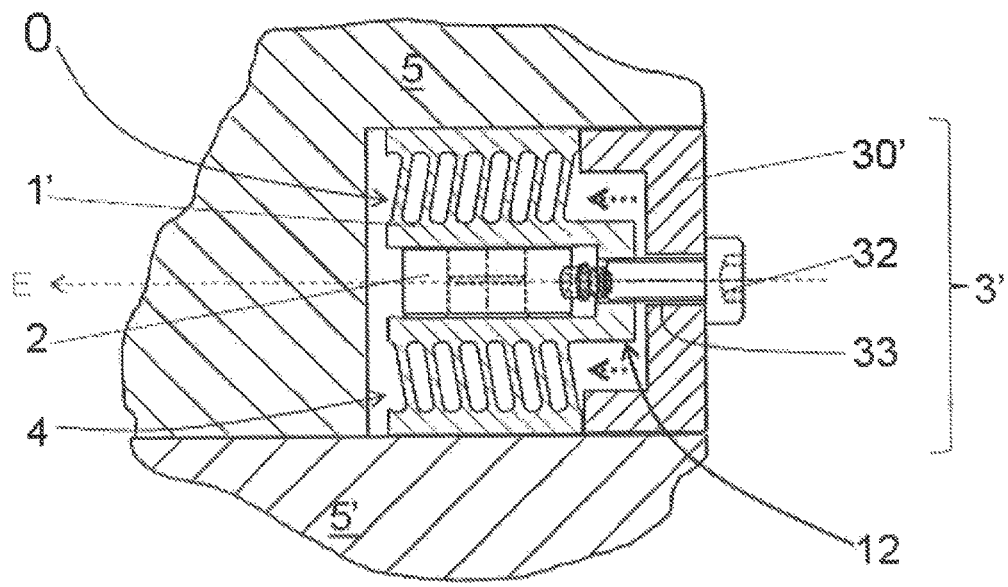

In a slightly modified embodiment of the securing means 3' and the preload device 1' illustrated in FIG. 5b, a modified beam 30' featuring a central through-bore with an internal thread 33 is separably fixed in a thread in the tool engagement section 12 by means of a central screw 32. The beam 30' can be screwed on by means of the central screw 32 such that it presses against the force introduction plates 100 in the direction of the arrow. In this case, the preload can also be adjusted by tightening the beam 30'. However, the alignment of the lamellae 1010 is changed in the preload device 1' according to FIG. 5b, wherein the elastically flexible sections 101 can be elastically deformed by subjecting the force introduction plates 100 to tension opposite to the inserting direction E and simultaneously subjecting the tool engagement section 12 to pressure in the inserting direction E. In order to respectively insert a thusly designed preload device 1' and to generate the forces required for its height reduction, a corresponding tool would have to be designed differently such that tensile forces can be exerted upon the force introduction plates 100 and a compressive force can be respectively exerted upon the tool engagement section 12 or a not-shown tension/pressure plate.

Figure 6A:
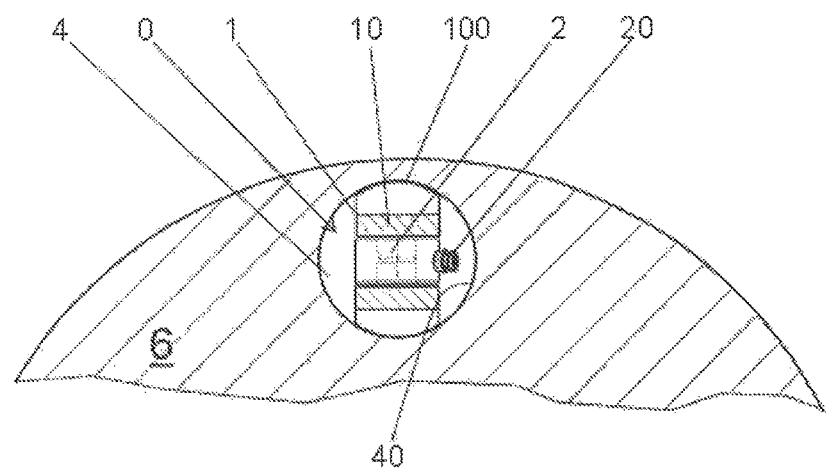
FIG. 6a shows a sectional view of a force-measuring device in a cylindrically symmetrical recess in a roller in the inserting direction.

According to FIG. 6a, the preload device 1 may be designed in such a way that it can be arranged in a cylindrical recess 4 in a roller 6, wherein forces that act upon the roller 6 radially can be measured. Referred to the inserting direction E into the recess 4, it can be gathered that the force introduction plates 100 of the arms 10 feature curved force introduction surfaces. The arms 10 are otherwise shaped as described above. The force introduction surfaces adapt themselves to the recess walls 40 in a segmented fashion. In this way, the flow of forces respectively is precisely introduced into the force measuring device 0 or the force sensor 2.

Figure 6B:
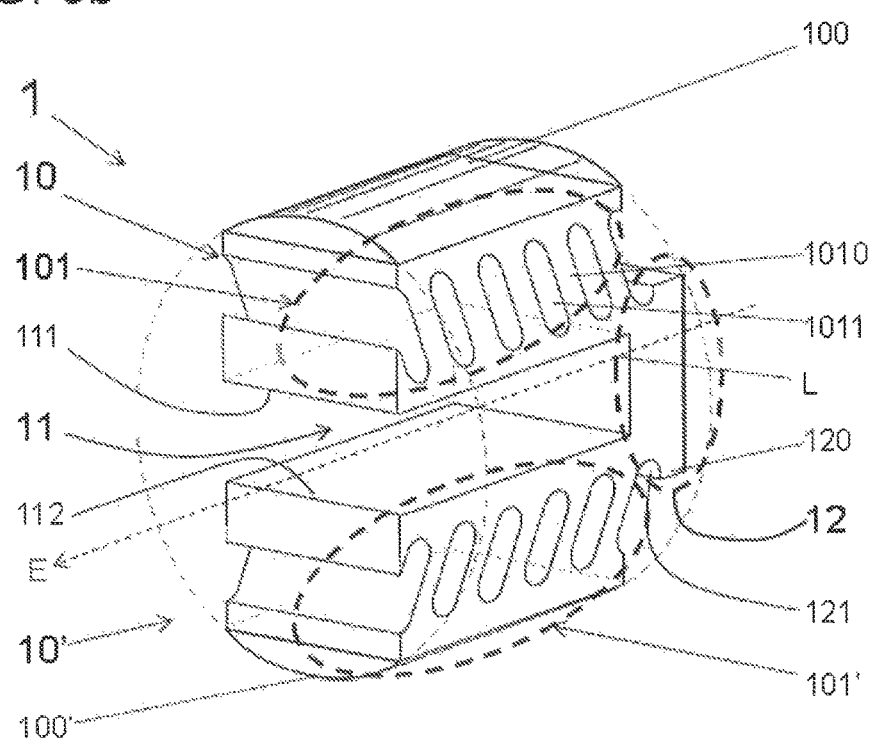
FIG. 6b shows a perspective view of a preload device with curved force introduction plates in a relaxed basic state outside a recess.

FIG. 6b only shows the preload device 1 without force sensor in order to elucidate a relaxed basic state. Since the force introduction surfaces have a curved design, a transmission of forces can be realized in a cylindrically shaped recess.

The preload device 1 is preferably realized in one piece or monolithically and accordingly forms a preload element 1. However, the individual sections may also consist of elements that can be separated from one another and connected into a preload device 1.

In this case, the receiving pocket 11 is respectively recessed or arranged centrally between the two arms 10, 10' such that the preload device 1 can be realized mirror-symmetrical referred to the longitudinal axis L. If a preload device 1 should be realized with one elastically flexible section 101 only, however, the receiving pocket 11 may also be positioned in the body of the preload device 1 asymmetrically referred to the longitudinal axis L.

The design of the two or only one elastically flexible section(s) 101, 101' may also be realized differently from the preceding detailed description. For example, the elastically flexible section 101 could be realized in the form of a leaf spring, wherein the distance of the force introduction plate 100 from the receiving pocket 11 is likewise elastically variable within certain limits.

The preload device 1 may consist of metallic materials, but also of a plastic or a rubber, wherein the material and the design of the preload device 1 must be adapted to the forces to be measured in the clamping direction.

A collet chuck may potentially be used as tool for inserting the preload device 1 into a desired recess 4.

LIST OF REFERENCE SYMBOLS

0 Force-measuring device
1 Preload device/preload element (one-piece)

10 Arm
100 Force introduction plate with force introduction surface
1001 Edge section
1002 Threaded bore
101 Elastically flexible section
1010 Lamellae
1011 Oblong holes
11 Receiving pocket
111 First wall
112 Second wall
12 Tool engagement section
120 Tension/pressure plate
121 Undercut
122 Internal thread
H Height in elastically tensioned installation state
Hg Height in relaxed basic state
h Height in insertion state
2 Force sensor
3 Securing means
30 Beam
31 Screw
32 Central screw
33 internal thread
4 Recess
40 Recess wall
5 Machine part
6 Roller
E Inserting direction/mounting direction
F Clamping direction and force application direction

The invention claimed is:

1. A preload device that can be arranged in a recess in a machine part or between multiple machine parts or in a roller for preloading a force sensor, the preload device comprising:
at least a first force introduction plate and a second force introduction plate, each of the first and second force introduction plates elongating along a longitudinal axis and disposed spaced apart from and opposite one another, each of the force introduction plates defining a respective force introduction surface that faces away from the other respective force introduction surface;
a first wall elongating along the longitudinal axis and disposed between the at least two force introduction plates;
a second wall elongating along the longitudinal axis and disposed between the first wall and the second force introduction plate and disposed spaced apart from the first wall and the second force introduction plate;
a tool engagement section connecting a first end of the first wall and a first end of the second wall;
wherein a receiving pocket that is configured for receiving therein the force sensor is defined between the first wall and the second wall and elongates along the longitudinal axis to the tool engagement section; and
at least one elastically flexible section disposed between the first force introduction plate and the first wall and configured wherein an elastic deflection of the at least one elastically flexible section due to forces upon at least one of the force introduction plates and the tool engagement section reduces the distance between the respective force introduction surfaces measured in a direction perpendicular to the longitudinal axis from a relaxed state of the preload device to an installation state of the preload device such that a preload will be transmitted to the force sensor within the receiving pocket in such a way that external forces applied to the force introduction surfaces of the force introduction plates are sensed by the force sensor.

2. The preload device according to claim 1, wherein both force introduction plates respectively are functionally connected to the at least one elastically flexible section.

3. The preload device according to claim 1, wherein the preload device is formed in one piece.

4. The preload device according to claim 3, wherein the preload device is made of a metallic material or a plastic.

5. The preload device according to claim 1, wherein the force introduction plates have curved force introduction surfaces such that the preload device can be inserted into a cylindrically shaped recess.

6. The preload device according to claim 1, wherein the at least one elastically flexible section is formed by a plurality of lamellae and oblong holes extending from the force introduction plate in the direction of the receiving pocket.

7. The preload device according to claim 6, wherein each of the elastically flexible lamellae and the oblong holes is aligned at an acute angle relative to the longitudinal axis.

8. The preload device according to claim 7, wherein the acute angle amounts to at least 80°.

9. The preload device according to claim 1, wherein the tool engagement section includes a tension/pressure plate that is configured to be functionally connected to a tool.

10. The preload device according to claim 1, further comprising:
at least a second elastically flexible section disposed between the second force introduction plate and the second wall and configured wherein an elastic deflection of the at least second elastically flexible section due to forces upon at least one of the force introduction plates and the tool engagement section reduces the distance between the respective force introduction surfaces measured in a direction perpendicular to the longitudinal axis from a relaxed state of the preload device to an installation state of the preload device such that a preload will be transmitted to the force sensor within the receiving pocket in such a way that external forces applied to the force introduction surfaces of the force introduction plates are sensed by the force sensor.

11. The preload device according to claim 1, wherein the receiving pocket is is defined with a mirror-symmetrical shape with respect to the longitudinal axis.

12. A force-measuring device comprising:
a preload device according to claim 1, and
a force sensor fixed in the receiving pocket.

13. The force-measuring device according to claim 12, wherein the preload device is configured to be separably mounted in the recess with the aid of securing means.

14. The force-measuring device according to claim 13, wherein the securing means includes a beam and at least one screw, and wherein the screws can be respectively fixed in one of a threaded bore in an edge section of the first force introduction plate or in the tool engagement section.

15. A method for mounting a force-measuring device according to claim 12 in a recess in a machine part or between multiple machine parts or in a roller, the method comprising the following steps:
exerting a force upon at least one force introduction plate and the tool engagement section in opposite directions parallel to the longitudinal axis of the preload device such that an elastic deflection of the at least one elastically flexible section takes place and simultaneously inserting the force-measuring device into the recess in an inserting direction along the longitudinal axis before the force ceases to be exerted and
subsequently discontinuing the exerting force so as to use the elastic resilience of the at least one elastically flexible section to clamp the preload device in the recess perpendicular to the inserting direction under preload in a clamping.

\* \* \* \* \*